(12) United States Patent
Choi et al.

(10) Patent No.: US 8,675,270 B2
(45) Date of Patent: Mar. 18, 2014

(54) SCANNING MICROMIRROR

(75) Inventors: Dong June Choi, Seoul (KR); Byung Goo Lee, Seoul (KR); Tae Sik Kim, Seoul (KR); Tae Sun Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 130 days.

(21) Appl. No.: 13/383,375

(22) PCT Filed: Aug. 26, 2010

(86) PCT No.: PCT/KR2010/005749
§ 371 (c)(1),
(2), (4) Date: Jan. 10, 2012

(87) PCT Pub. No.: WO2011/037327
PCT Pub. Date: Mar. 31, 2011

(65) Prior Publication Data
US 2012/0250124 A1 Oct. 4, 2012

(30) Foreign Application Priority Data

Sep. 23, 2009 (KR) .......... 10-2009-0090102

(51) Int. Cl.
*G02B 26/08* (2006.01)
(52) U.S. Cl.
USPC ...................................... 359/198.1
(58) Field of Classification Search
USPC .......................... 359/223.1–226.1
See application file for complete search history.

(56) References Cited

U.S. PATENT DOCUMENTS

| 6,844,952 B2 * | 1/2005 | Dalziel ............... 359/224.1 |
| 2007/0117051 A1 | 5/2007 | Fu |
| 2007/0258120 A1 | 11/2007 | Ko et al. |

FOREIGN PATENT DOCUMENTS

| JP | 2006-085152 A | 3/2006 |
| JP | 2008-242207 A | 10/2008 |
| KR | 10-0695175 B1 | 3/2007 |
| KR | 10-0789574 B1 | 12/2007 |
| WO | WO 02/079853 A1 | 10/2002 |

* cited by examiner

*Primary Examiner* — Euncha Cherry
(74) *Attorney, Agent, or Firm* — Birch, Stewart, Kolasch & Birch, LLP

(57) ABSTRACT

The present invention may relate to a scanning micromirror. The scanning micromirror can include a substrate having an open region; a micro plate provided in the open region; a first gimbal provided between the substrate and the mirror plate, and including a first curvature curved toward the mirror plate along an X-axis of the open region; a second gimbal including a second curvature formed along the first curvature of the first gimbal; a first elastic body configured to connect the substrate with the first curvature of the first gimbal; a second elastic body configured to connect the first gimbal with the second gimbal along a Y-axis of the open region; and a third elastic body configured to connect the second gimbal with the mirror plate along the Y-axis of the open region.

20 Claims, 10 Drawing Sheets

SCANNING MICROMIRROR

BACKGROUND OF THE INVENTION

1. Field of the Invention

The present invention may relate to an optical scanning device, more particularly, to a scanning micromirror that forms an image or reads data by injecting a beam emitted from a lighting source toward a one-dimensional or two-dimensional region.

2. Discussion of the Background

Recently, there have been under development various technologies that use a light as an input/output terminal of various information and as a mediator of information transmission, together with development of optical device technology. Especially, a barcode scanner or a scanning laser display may be a prime example of technologies using a light emitted from a lighting source.

Such technologies are incorporated into MEMS technology and more compact-sized and lighter products have been developing.

The beam scanning display system typically requires high spatial resolution. Because of that, it requires a scanning mirror capable of realizing a rapid injection velocity and a rapid angular displacement or tilting angle.

In case of increasing angular displacement of a scanning mirror, there may be an advantage of realizing a maximum-sized screen even in a narrow room.

SUMMARY OF THE INVENTION

An object of the present invention may be to provide a scanning micromirror that is able to prevent stress concentration generated in a spring during rotation and to adjust the maximum stress generation region by improving a structure of a scanner spring.

Another object of the present invention may be to provide a scanning micromirror that is able to use a flexible gimbal to reduce a mass and inertia of the gimbal and to use the flexible gimbal for absorbing a shock to improve shock resistance.

A further object of the present invention may be to provide a scanning micromirror that can use a structure of a perpendicular spring inserted in the gimbal to prevent an undesired movement generated in the gimbal to prevent damage to the gimbal and to enhance the shock resistance.

A scanning micromirror according to the present invention may include a substrate comprising an open region; a micro plate provided in the open region; a first gimbal provided between the substrate and the mirror plate, the first gimbal comprising a first curvature curved toward the mirror plate along an X-axis of the open region; a second gimbal provided between the first gimbal and the mirror plate, the second gimbal comprising a second curvature formed along the first curvature of the first gimbal; a first elastic body configured to connect the substrate with the first curvature of the first gimbal; a second elastic body configured to connect the first gimbal with the second gimbal along a Y-axis of the open region; and a third elastic body configured to connect the second gimbal with the mirror plate along the Y-axis of the open region.

A distance from an end of the first curvature to the substrate may be larger than a distance from the other end of the first curvature to the mirror plate. A distance from an end of the second curvature to the substrate may be larger than a distance from the other end of the second curvature to the mirror plate.

A distance from an end of the second curvature to the mirror plate may be identical to the length of the third elastic body.

An inner circumferential surface of the first gimbal may face an outer circumferential surface of the second gimbal and each of the facing surfaces may maintain a uniform internal there between.

A groove may be formed in a connected region between the first gimbal and an end of the second elastic body, along a Y-axis direction. A groove may be formed in a connected region between the first gimbal and an end of the first elastic body, along an X-axis direction. A groove may be formed in a connected region between the second gimbal and an end of the third elastic body, along a Y-axis direction.

The width of the first gimbal may be identical to the width of the second gimbal.

The first, second and third elastic bodies may have different lengths and identical lengths, respectively.

Next, the first elastic body may have an internal region positioned in the first curvature and an external region positioned outer to the first curvature, and the length of the internal region may be larger than the length of the external region.

Also, at least one of the first, second and third elastic bodies may have a gradually decreasing width from both ends toward a center thereof.

Here, at least one of the first, second third elastic bodies may have plane top and bottom surfaces and curved lateral surfaces.

A first end of the third elastic body may be connected with a support of the second gimbal and the other second end of the third elastic body may be connected with a support of the mirror plate, and the thicknesses of the supports are larger than the thicknesses of the first and second ends of the third elastic body.

At this time, a connected region between the first end of the third elastic body and the support of the second gimbal may have first tilted surface with a predetermined slope, and a connected region between the other second end of the third elastic body and the support of the mirror plate may have a second tilted surface with a predetermined slope, and edge lines of the supports may be positioned between an edge line of the first tilted surface and an edge line of the second tilted surface.

In another aspect of the present invention, a scanning micromirror may include a substrate comprising an open region; a mirror plate provided in the open region; a gimbal provided in an open region positioned between the substrate and the mirror plate; a first elastic body configured to connect the substrate with the gimbal along an X-axis of the open region; and a second elastic body configured to connect the gimbal with the mirror plate along a Y-axis of the open region, the second elastic body having a gradually decreasing width from both ends toward a center thereof.

Here, the gimbal may include a curvature curved toward the mirror plate along the X-axis of the open region. The first elastic body may be connected with the curvature of the gimbal.

The scanning micromirror according to the present invention has following advantageous effects.

The present invention may prevent stress concentration generated in a spring during rotation of the scanning micromirror and adjust by improving the structure of the scanner spring. Also, the present invention may increase the maximum rotation driving quantity by adjusting the maximum stress generation area.

Furthermore, the present invention may use the flexible gimbal and it may reduce the mass and inertia of the gimbal accordingly. Also, the gimbal may absorb a shock applied thereto and shock resistance of the scanning micromirror system may be enhanced.

Still further, the present invention may use the structure having the vertical spring insertedly positioned in the gimbal. Because of that, undesired much movement which might be generated in the gimbal may be prevented to prevent fracture of the system and shock resistance may be enhanced accordingly.

DETAILED DESCRIPTION OF THE EMBODIMENTS

Figure 1:
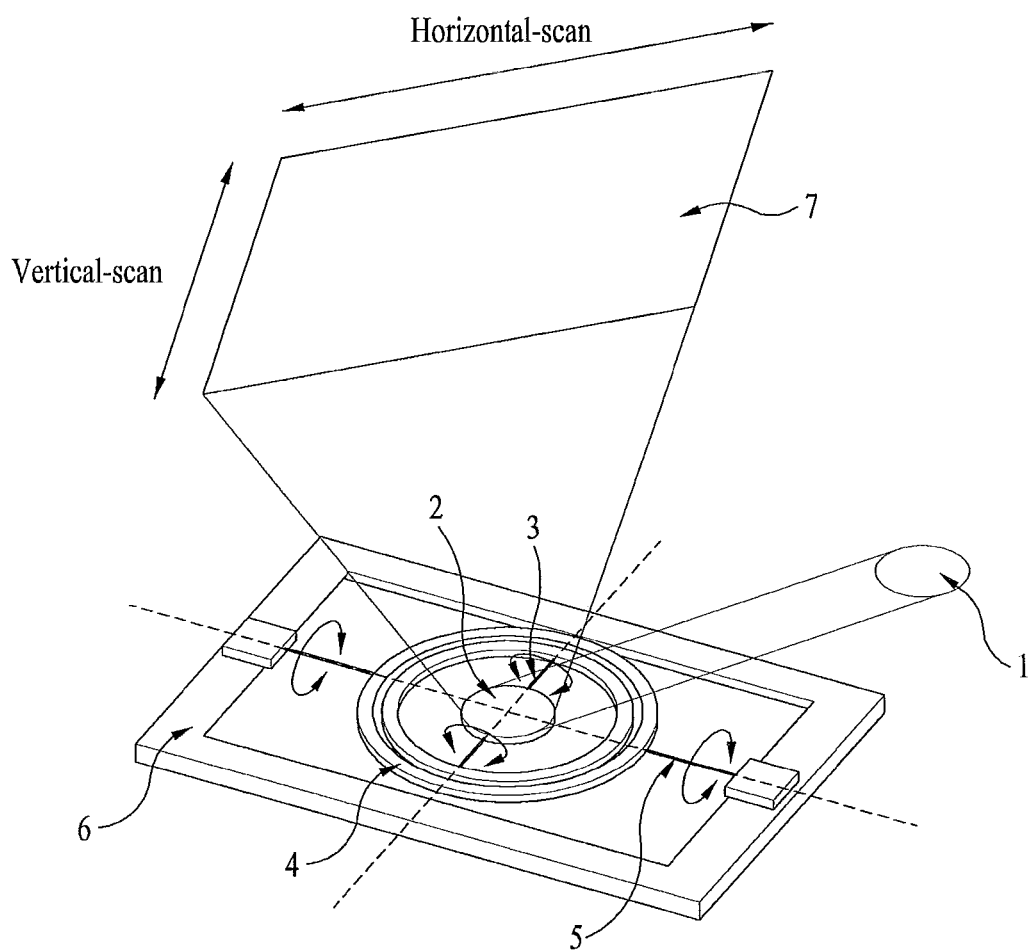
FIG. 1 is a schematic diagram illustrating a conventional electromagnetic driving 2-shaft scanning micromirror.

As follows, an exemplary embodiment will be described in reference to the accompanying drawings.

The present invention may provide a method of increasing driving angular displacement generated in a scanning micromirror fabricated based on MEMS technology.

Especially, the present invention may provide a method of preventing fracture which might be generated before a rotational angle by stress concentration.

Typically, an allowable dynamic deformation level based on a wavelength of an incident light may be set in a mirror provided in a microscanner used for a display. To satisfy the allowable dynamic deformation level, the mirror may have a preset thickness.

Also, in case of vertical and horizontal driving, swing has to be performed at a preset standardized frequency. A profile of the mirror has to be designed based on the width and thickness of the spring.

For example, if the micromirror is used for a laser display as an optical rotation for image formation, a vertical driving frequency may be dozens of Hz and a horizontal driving frequency may be dozens of kHz. A ratio of the vertical driving frequency to the horizontal driving frequency may be hundreds to one. The profile of the spring has to be designed to compensate such the frequency ratio.

To adjust the required design conditions and profiles of the mirror and the spring, the widths and thicknesses of various structures such as the mirror and the spring happen to be different from each other. To realize them, dry-etching and wet-etching may be mixed appropriately.

Especially, in the wet-etching, an etching tilted-surface tilted at approximately 54.7 degrees may be generated at an edge line of MASK. If stress is generated such a tilted surface, stress might be concentrated on the edge line. The stress might reach a fracture stress and the MASK might be fractured, even if a little driving angular displacement is increased.

As a result, the stress concentration at the edge line might be a factor used for preventing the increase of driving angular displacement of a MEMS scanner.

To solve the problem, MASK has to be designed to determine a position of an edge line between the tilted surfaces generated by the thickness difference between the structures (a line which two edge surfaces meet) and a position of a weak point (a point which an edge line and another edge line meet). The structures have to be designed and driving angles may be increased, not to generate large stress at the edge line.

Also, if a center area of a square beam-shaped spring is narrow, the stress generated at the edge line and the weak point may be reduced and the maximum angular displacement may be increased more.

The present invention may provide a method for enhancing shock resistance of structures by embodying a gimbal with a flexible structure.

When an external shock is applied to a scanning mirror, the gimbal and mirror occupying most of the inertia possessed by a scanner may accompany too much translation and rotation. A vertical spring occupying the gimbal and mirror might reach a fracture stress which can generate fracture.

Especially, in case of a scanning mirror having the gimbal structure, the inertia of the gimbal may act in an outer spring, together with the inertia of the mirror. Because of that, the outer spring might be more fragile to a shock and this might be a big weak point in system application.

A conventional gimbal has been designed to be stiff without flexibility.

However, in case of designing the flexible gimbal, a mass of the gimbal may be reduced and a profile of the gimbal may be changed to absorb a shock applied thereto. Because of that, a shock resistance in the system may be enhanced advantageously.

Furthermore, according to the present invention, a vertical spring may be inserted in the gimbal to prevent too much translation and rotation of the gimbal. The vertical spring may be employed as a stopper configured to limit the too much movement of the gimbal. As a result, the shock resistance may be improved.

FIG. 1 is a schematic diagram of a conventional electromagnetic force-based driving 2-shaft scanning micromirror.

As shown in FIG. 1, an incident light 1 may be reflected by a micromirror 2 that is able to pivot vertically and horizontally, to form an image 7 having a driving angular in proportion to a driving angle of the micromirror 2.

The conventional scanning micromirror may include the micromirror 2, a horizontal spring 3, a gimbal 4, a vertical spring 5 and a supporting end 6.

Here, the micromirror 2 may be supported by the horizontal spring 3 employed as a pivot at both ends of the micromirror, with providing a horizontal restitution torque to the micromirror 2 when the micromirror 2 is driven.

The horizontal spring 3 may be connected with the gimbal 4.

The gimbal 4 may be supported by the vertical spring 5 also employed as a pivot, with providing a vertical restitution torque when the gimbal 5 is driven. The gimbal 4 may be connected with the supporting end 6.

Figure 2:
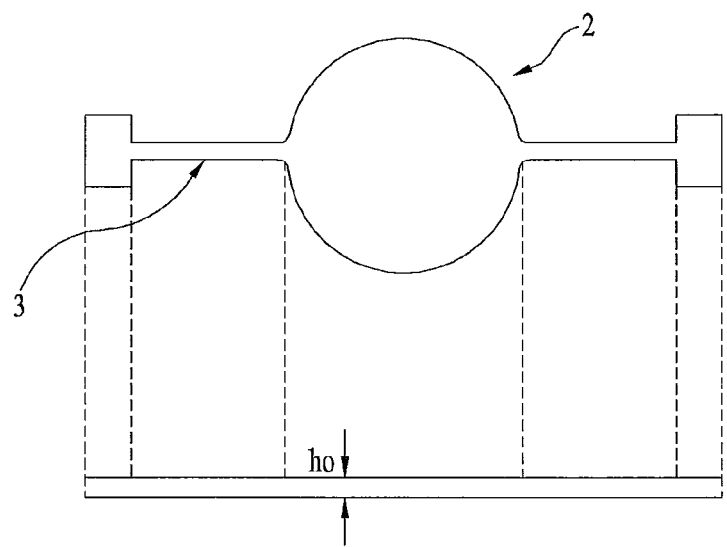
FIG. 2 is a plane view and a side view illustrating the micromirror shown in FIG. 1 and a horizontal spring supporting the micromirror.

FIG. 2 is a plane view and a side view illustrating the micromirror of FIG. 1 and the horizontal spring supporting the micromirror.

As shown in FIG. 2, the thickness of the micromirror 2 may be h0 that is identical to the thickness of the horizontal spring 3.

In this case, when the micromirror is driven to the maximum angle with a rounded edge, a middle area of the horizontal spring 3 is typically fractured where the maximum stress is generated.

Figure 3:
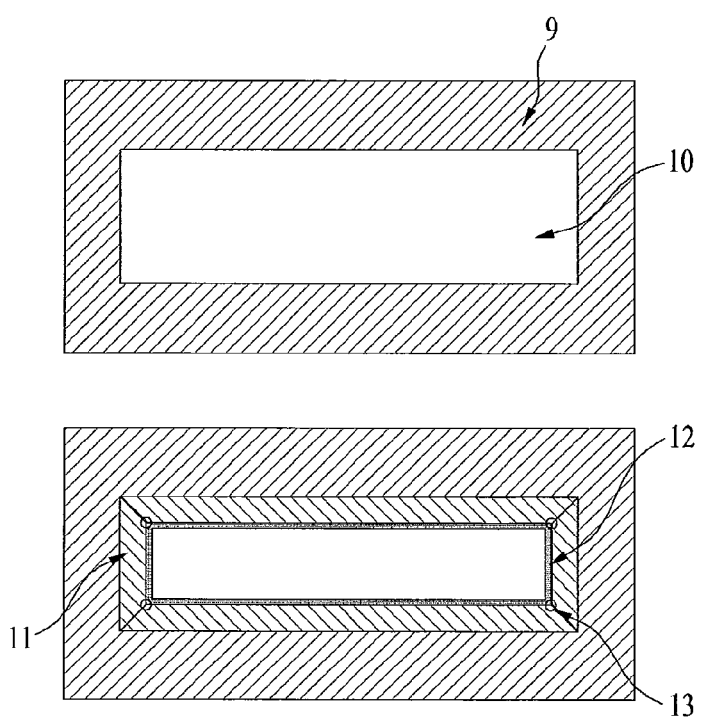
FIG. 3 is a diagram illustrating an etching tilted surface generated in an etching process.

FIG. 3 is a diagram illustrating an etching tilted surface generated in an etch process. As shown in FIG. 3, a photoresist (PR) layer may be coated on an edge area 9 of a wafer to etch a center area 10 of a wafer.

When a wet-etch process is performed after that, a tilted surface 11, an edge line 12 and a weak point 13 may be shown in a boundary surface between the center area and the edge area.

In other words, to process a profile of a structure based on a design, a wet-etch process has to be performed. If an etching tilted-surface is generated in the structure in this case, stress concentration might be generated at the edge line 12 and the weak point 13.

Figure 4:
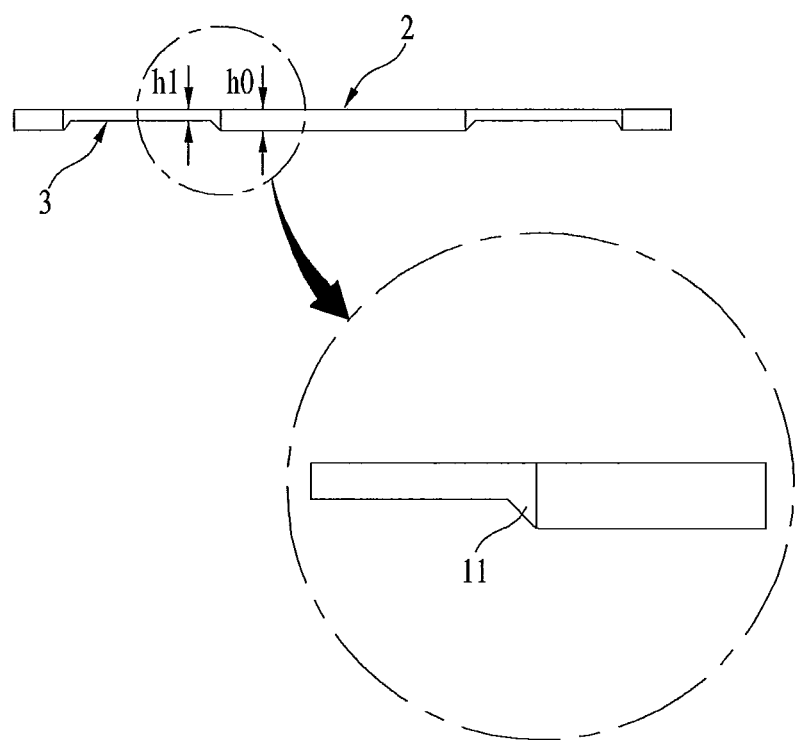
FIG. 4 is a sectional view illustrating a spring processed in a wet-etching process shown in FIG. 3.

FIG. 4 is a sectional view of a spring processed in the wet-etch process of FIG. 3.

As shown in FIG. 4, the thickness (h0) of the micromirror 2 might be different from the thickness (h1) of the horizontal spring 3 when various factors are put into consideration in actual designing of a scanning micromirror. To realize the micromirror 2 and the horizontal spring, a dry-etch and a wet-etch has to be mixed properly.

Especially, if the wet-etch is performed, an etching tilted surface 11 with an angle of approximately 54.7 degrees is generated at an edge line of MASK.

Figure 5:
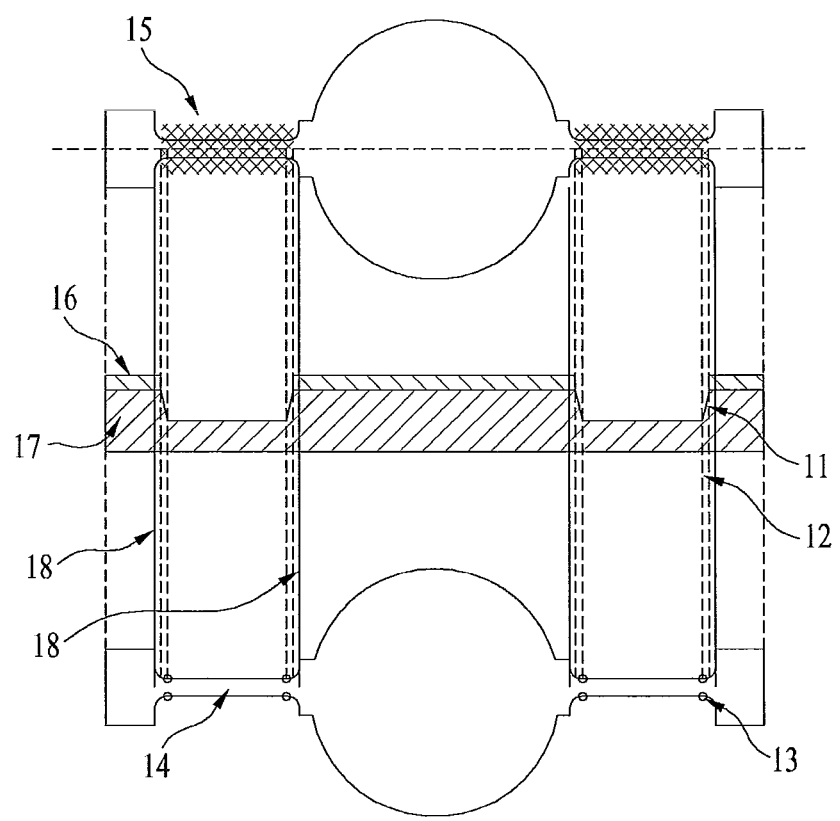
FIG. 5 is a diagram illustrating different thicknesses possessed by the micromirror and the horizontal spring.

FIG. 5 is a diagram illustrating a structure that the thickness of the micromirror is different from the thickness of the horizontal spring. As shown in FIG. 5, a photoresist layer 16 is disposed on a wafer 17 and a wet etching process is performed by using MASK 15. After that, a tilted surface 11 is generated in the etched horizontal spring and an edge line 12 and a weak point 13 are generated in the tilted surface 11.

Here, the edge line 12 of the tilted surface may be positioned between edge lines 18 of a supporting end and the weak point 13 is also positioned between the edge lines 18 of the supporting end.

If the weak points 13 are positioned between the edge lines 18 of the supporting end, the supporting end might be fractured easily.

In other words, if stress is generated in such an etched surface tilted approximately 54.7 degrees that is generated on the structure, especially, in the edge line 12 and the weak point 13 positioned outer to the edge line 18 of the supporting end as shown in the drawing, stress concentration might be generated at the edge line 12 and the weak point 13. A fracture stress may be reached even with a little increase of a driving angular displacement and the structure results in fracturing.

The stress concentration at the processed edge may be a facture preventing much increase of a driving angular displacement of the MEMS scanner.

Figure 6:
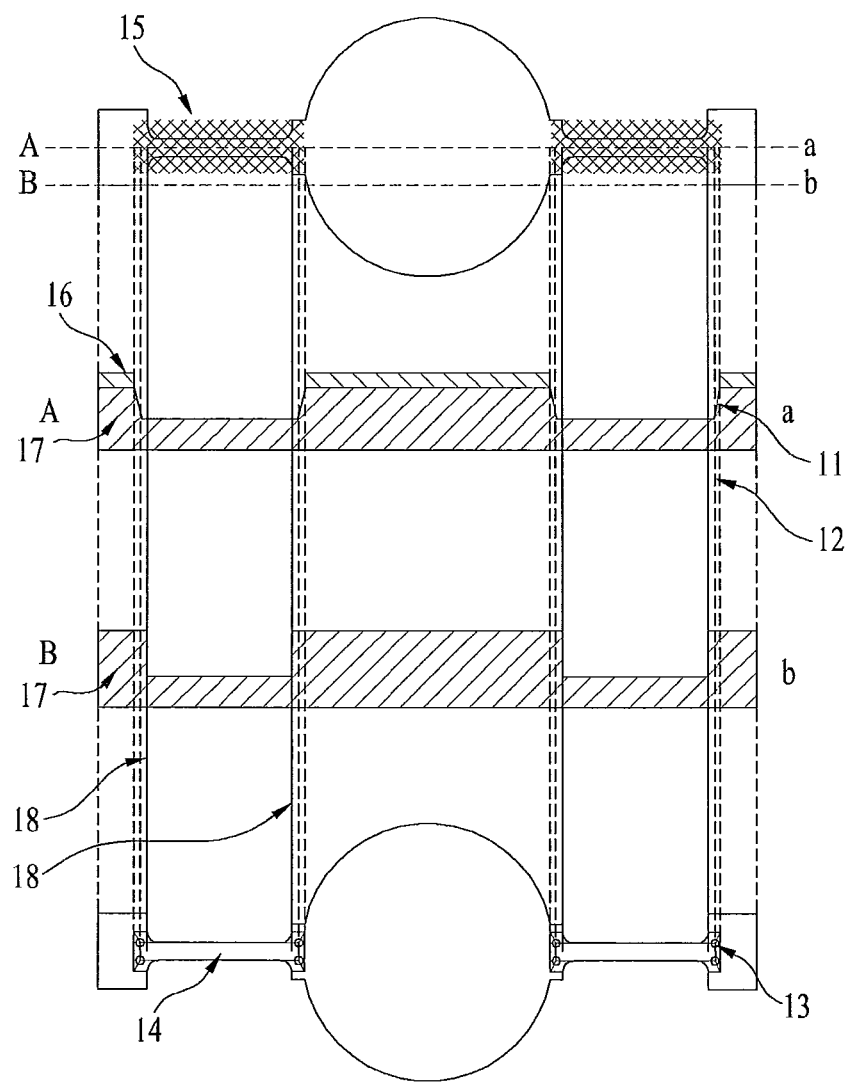
FIG. 6 is a diagram illustrating a method of processing the horizontal spring according to the present invention.

FIG. 6 is a diagram illustrating a method of processing a horizontal spring according to the present invention. FIG. 6 is a diagram according to an embodiment that is able to increase a driving angle of a system as much as possible by preventing stress concentration in a tilted surface structure generated in the wet etch process.

As shown in FIG. 6, according to the present invention, a photoresist layer 16 may be disposed on a wafer 17 and a wet etch process may be performed on the wafer 17 having the photoresist layer 16 disposed thereon. After that, a tilted surface 11 may be generated in an etched horizontal spring 14 and an edge line 12 and a weak point 13 may be generated in the tilted surface 11.

Here, an edge line 18 of a supporting end may be disposed between the edge lines 12 of the tilted surface and the weak points 13 may be disposed on the supporting end positioned between the edge lines 18 of the tilted surface.

When the weak points 13 are positioned on the supporting end, stability may be achieved.

In other words, the present invention may be the method of positioning the edge line 12 and the weak point 13 disposed in the etched tilted-surface in the edge line 18 of the supporting end to position them within the supporting end.

When the edge line 12 and the weak point 13 are positioned in the supporting end, a driving angle may be increased more in comparison to an opposite case. As the edge line 12 and the weak point 13 are inserted into the supporting end more and more, the effect of increased driving angle may be enhanced more and more.

Such the supporting end is where neither movement nor transformation is generated or little stress is generated when movement or transformation of the system is generated. An end of the horizontal spring may be formed in the supporting end according to the present invention, to increase the driving angle.

Figure 7:
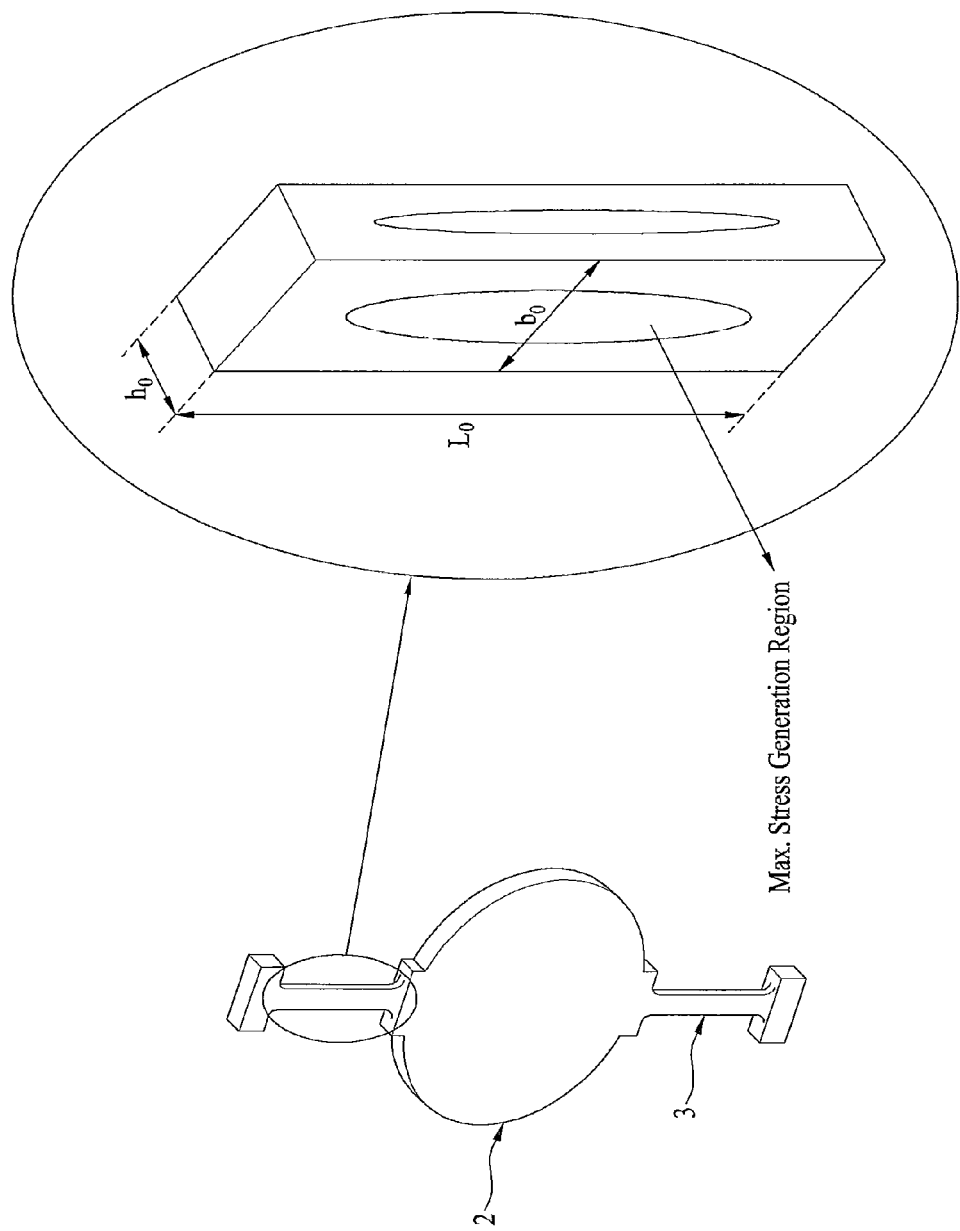
FIG. 7 is a diagram illustrating stress distribution generated in a horizontal spring with an uniform width during rotation.

FIG. 7 is a diagram illustrating stress distribution generated in the horizontal spring having a uniform width, when it is pivoting.

As shown in FIG. 7, the horizontal spring 3 has a square sectional beam shape, with a height of h0, a width of b0 and a length of L0.

The maximum stress may be generated in a center of a longitudinal surface (b0) of such a simple square sectional beam spring, when the spring is pivoting, and the stress may be distributed over a relatively large area.

Figure 8:
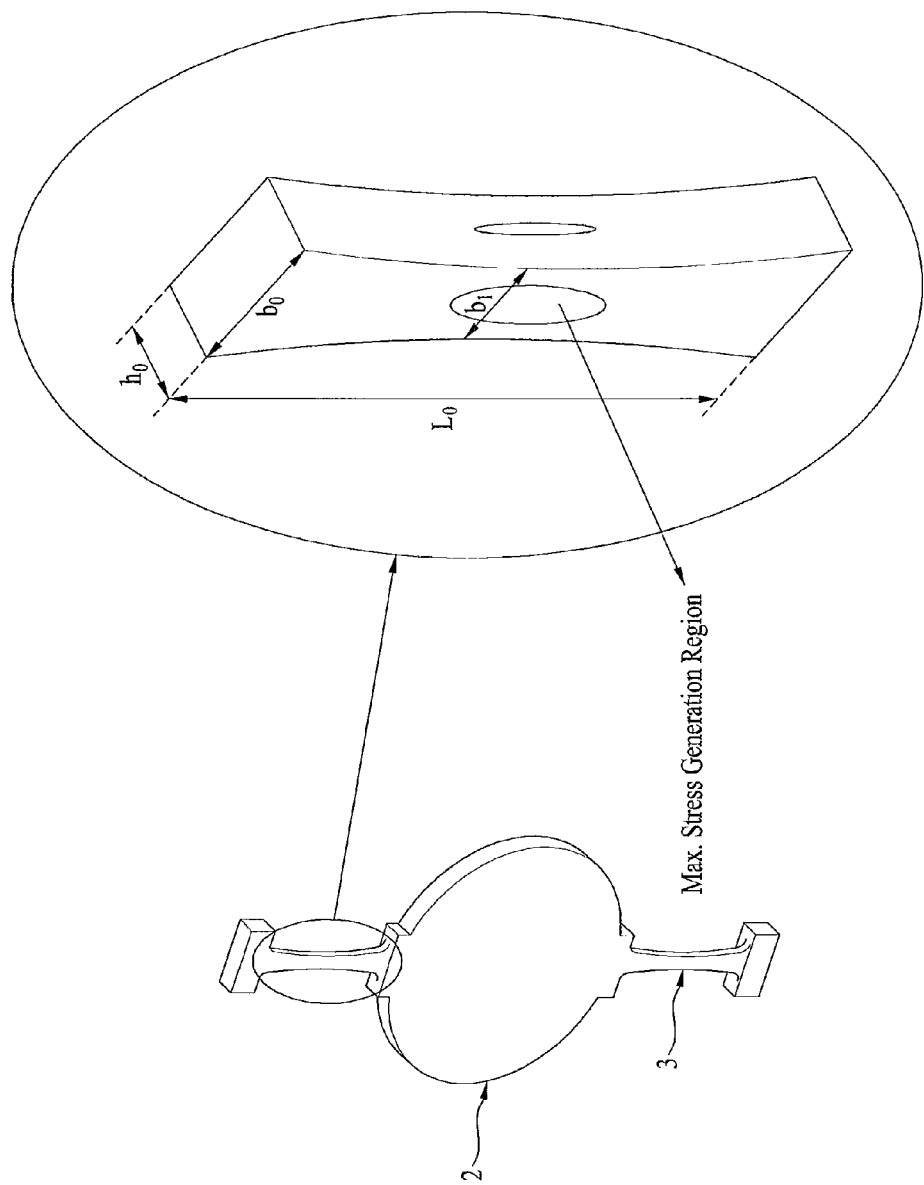
FIG. 8 is a diagram illustrating stress distribution generated in the horizontal spring according to the present invention during rotation.

FIG. 8 is a diagram illustrating stress distribution generated in the horizontal spring according to the present invention, when it is pivoting.

As shown in FIG. 8, the width (b) of the horizontal spring 3 according to the present invention may be getting narrower toward a center (b1) from both opposite ends (b0).

The horizontal spring 3 according to the present invention may be beam-shaped, with a variable sectional width from b0 to b1 not a simple square sectional beam shape.

That shape may enable a MASK pattern in the MEMS process to be corrected and it may be easily realized simply and easily by a dry reaction ion etching (DRIE etching).

When the mirror is pivoting, the maximum stress of the simple square beam spring may be generated in a center of a longitudinal surface thereof.

When the micromirror performs torsion driving, it is typical based on a theory that fracture is generated by the stress concentration at the processed edge line and the weak point generated by a processing method more often than a fracture generated in the center of the longitudinal surface of the spring.

However, a narrower spring is applied as shown in FIG. 8 and the area where the maximum stress is generated may be concentrated on a center thereof. After that, stress generated in the area the stress concentration is generated may be relatively reduced. Because of that, the maximum driving angle of the micromirror may be increased more.

Figure 9:
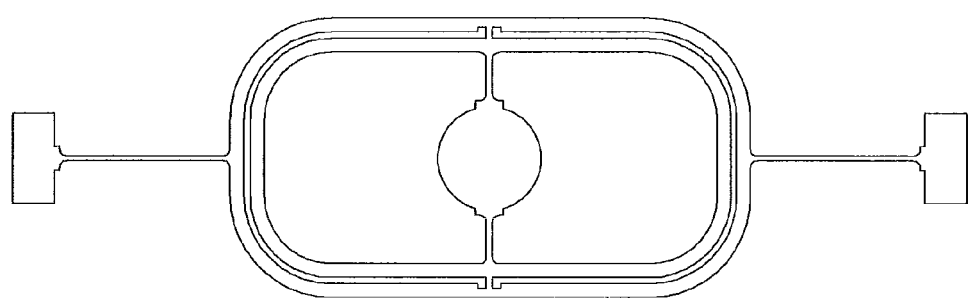
FIG. 9 is a diagram illustrating a conventional micromirror system.

FIG. 9 is a diagram illustrating a conventional micromirror system. As shown in FIG. 9, a scanning micromirror manufacture based on MEMS technology may be vulnerable to a shock.

Especially, it is typically that an outermost vertical spring in contact with the gimbal is fractured by the inertias of the gimbal and the micromirror.

Figure 10:
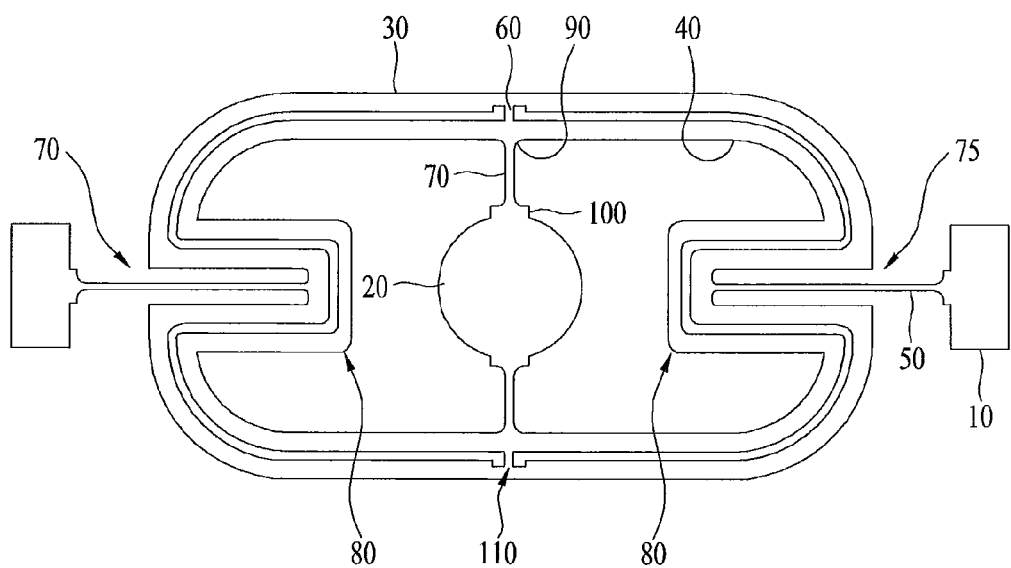
FIG. 10 is a diagram illustrating a micromirror system according to the present invention.

FIG. 10 is a diagram illustrating the micromirror system according to the present invention with the structure of the gimbal having the vertical spring insertedly positioned therein.

As shown in FIG. 10, the micromirror system according to the present invention may include a substrate, a mirror plate 20, a first gimbal 30, a second gimbal 40 and first, second and third elastic bodies 50, 60 and 70.

Here, the substrate (not shown) may include an open region provided at a center thereof and a supporting end 10 may be formed on the substrate, with being connected with the first elastic body 50.

The mirror plate 20 may be positioned in the open region of the substrate and it may pivot around the first, second and third elastic bodies 50, 60 and 70.

The first gimbal 30 may be positioned in an open region provided between the supporting end 10 of the substrate and the mirror plate 20. The first gimbal 30 may include a first curvature 70 curved toward the mirror plate 20 along X-axis of the open region.

The second gimbal 40 may be positioned in an open region provided between the first gimbal 30 and the mirror plate 20. The second gimbal 40 may include a second curvature 80 formed along the first curvature 70 of the first gimbal 30.

Here, the first and second gimbals 30 and 40 may be oval-shaped, with an X-axis direction width that is larger than a Y-axis direction width. A distance from an end of the first curvature 70 to the supporting end 10 may be larger than a distance from the other end of the first curvature 70 and the mirror plate 20. A distance from an end of the second curvature 80 to the supporting end of the substrate may be larger than a distance from the other end of the second curvature 80 to the mirror plate 20.

The reason why the curvatures are formed in the first and second gimbals, respectively, will be described later.

The first elastic body 50 may be a vertical spring connecting the substrate supporting end 10 with the first curvature 70 of the first gimbal 30. The first gimbal 30 may pivot around the first elastic body 50.

The second elastic body 60 may be a horizontal spring connecting the first and second gimbals 30 and 40 with each other along Y-axis of the open region. The second gimbal 40 may pivot around the second elastic body 60.

The third elastic body 70 may be a horizontal spring connecting the second gimbal 40 with the mirror plate 20 along Y-axis of the open region, with the width along both ends that is different from the width along a center.

Here, the width of the third elastic body 70 may be getting narrower from both ends (b0) toward the center (b1) as shown in FIG. 8.

In other words, each of top and bottom surfaces of the third elastic body 70 may have the width along both ends thereof that is larger than the width along a center thereof.

Also, each of the top and bottom surfaces may be plane and each of lateral surfaces may be curved gently.

Here, a first end of the third elastic body 70 may be connected with a support 90 and the other second end of the third elastic body 70 may be connected with a support 100 of the mirror plate 20.

The supports 90 and 100 may be thicker than the first and second ends of the third elastic body 70. A connected region between the first end of the third elastic body 70 and the support 90 of the second gimbal 40 may have a first tilted surface tilted a predetermined slope. A connected region between the second end of the third elastic body 70 and the support 100 of the mirror plate 20 may have a second tilted surface tilted a predetermined slope.

At this time, edge lines of the supports 90 and 100 may be disposed between edge lines of the first tilted surface and edge lines of the second tilted surface.

Also, in FIG. 10, a distance from an end of the second curvature 40 to the mirror plate 20 may be identical to the length of the third elastic body 70.

An inner circumferential surface of the first gimbal 30 may face an outer circumferential surface of the second gimbal 40. A uniform interval may be maintained between the facing surfaces.

A groove 110 may be formed in the first gimbal 30 along a Y-axis direction and along a reverse direction of the mirror plate 20, to connect the first gimbal 30 with the end of the second elastic body 60.

Alternatively, a groove may be formed in a connected region between the first gimbal 30 and the end of the first elastic body 50, along an X-axis direction.

Also, a groove may be formed in a connected region between the second gimbal 40 and the end of the third elastic body 70 along the Y-axis direction.

The width of the first gimbal 30 may be identical to the width of the second gimbal 40.

The first, second and third elastic bodies 50, 60 and 70 may have different lengths from each other and identical widths to each other, respectively.

Here, at least one of the first, second and third elastic bodies 50, 60 and 70 may have a gradually narrower width from end regions toward a center region.

At least one of the first, second and third elastic bodies 50, 60 and 70 may have plane top and bottom surfaces and curved lateral surfaces.

The first elastic body 50 may have an internal region positioned in the first curvature 70 and an external region positioned outer to the first curvature 70. The length of the internal region may be larger than the length of the external region.

As a result, when a predetermined external force such as a shock is applied to the first and second gimbals 30 and 40, the first and second gimbals 30 and 40 may be moveable along a Z-axis direction of the open region because of the first and second curvatures 70 and 80.

In other words, the springs may be insertedly positioned in the gimbals according to the present invention. Because of that, the effect of overall scanner width reduction may be achieved and too much movement of the gimbals may be limited by the vertical spring when the external shock is applied to the gimbals.

As a result, the vertical spring may be employed as a stopper capable of preventing the increased displacement of the micromirror system from being generated against the external shock. Because of that, shock resistance may be improved.

A micromirror system according to another embodiment may include a substrate, a mirror plate, at least one gimbal, a first elastic body and a second elastic body.

Here, a single gimbal or a plurality of gimbals may be provided in an open region formed between a supporting end of the substrate and the mirror plate.

The first elastic body may connect the substrate with the gimbal along an X-axis of the open region. The second elastic body may connect the at least one gimbal with the mirror plate along a Y-axis of the open region, with a gradually decreased width from both ends toward a center thereof.

Alternatively, the gimbal may include a curvature curved toward the mirror plate along the X-axis of the open region and the first elastic body may be connected with the curvature of the gimbal.

In other words, according to this embodiment, if a single gimbal is provided, two elastic bodies may be provided and one of the elastic bodies connecting the gimbal with the mirror plate, positioned there between, may have the gradually decreased width from both ends toward a center thereof.

Figure 11:
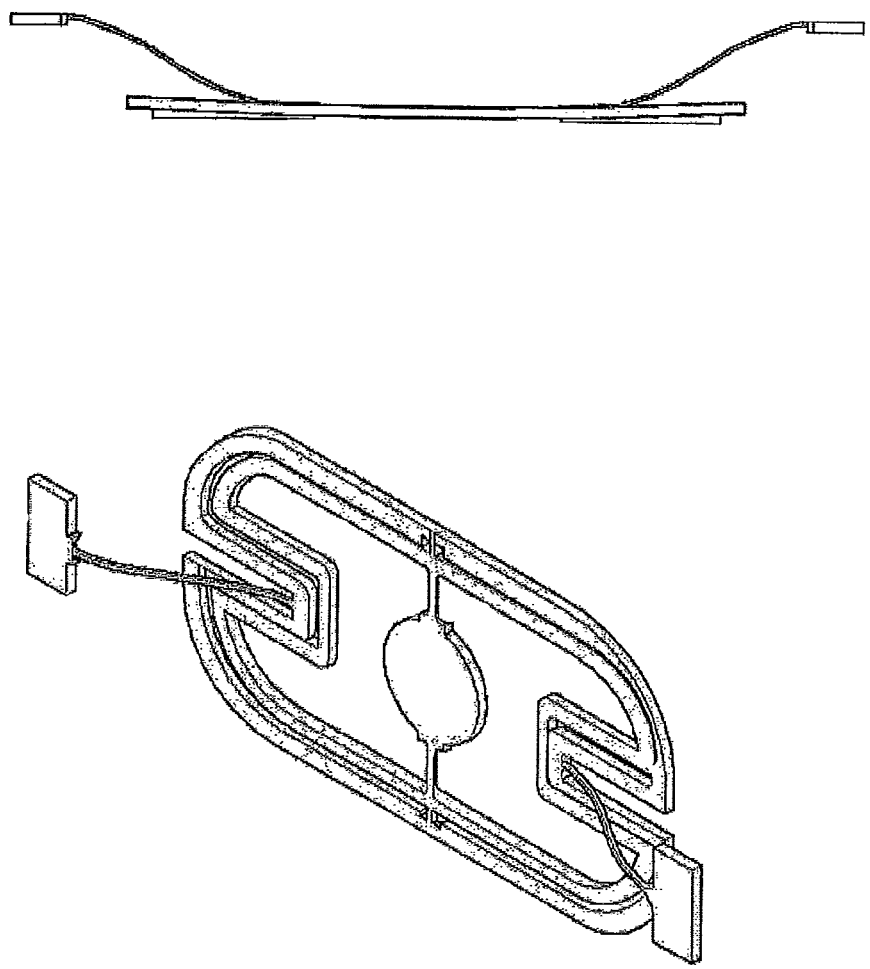
FIG. 11 is a diagram illustrating a scanner having a stiff structured gimbal that is transformed when a shock is applied thereto.

FIG. 11 is a diagram illustrating the scanner including the gimbal with the stiff structure that is transformed when a shock is applied thereto.

As shown in FIG. 11, the micromirror and the gimbal perform translation and pivoting almost as one body against the shock applied thereto and the vertical spring supporting them is transformed.

In this case, the vertical spring is resisting almost all of the shock and it is typical that stress of the vertical spring reaches a fracture stress.

Figure 12:
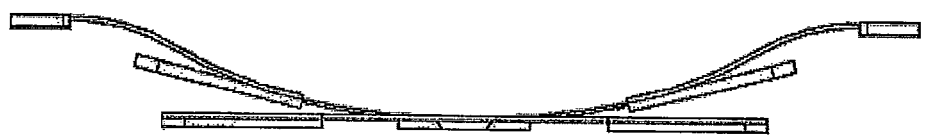
FIG. 12 is a diagram illustrating a scanner having a flexible gimbal according to the present invention that is transformed when a shock is applied thereto.
Figure 12:
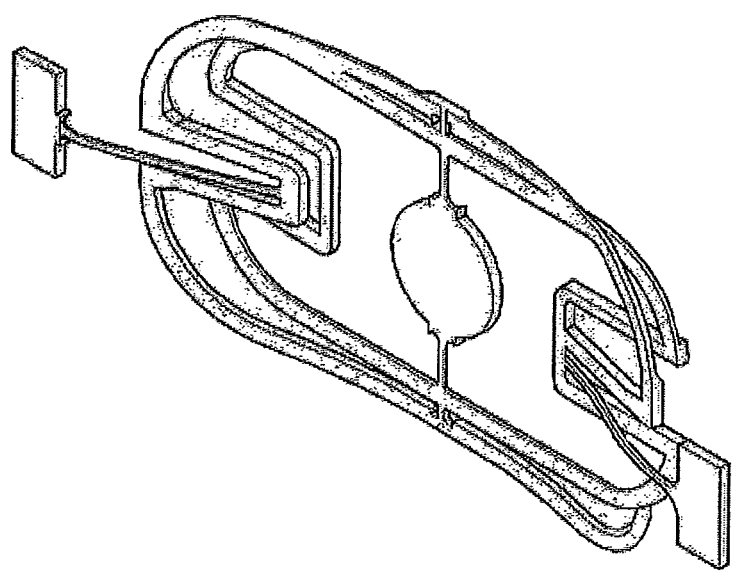

FIG. 12 is a diagram illustrating the scanner according to the present invention including the gimbal with the flexible structure that is transformed when a shock is applied thereto.

The flexible gimbal may have a reduced thickness or width compared with the stiff gimbal and it may be transformed against a driving or a shock applied thereto.

As shown in FIG. 12, the gimbal may be transformed to absorb the shock partially and it may disperse the impulse transmitted to the vertical spring that is most vulnerable to the shock applied thereto.

In other words, when the impulse is generated, the transformation of the gimbal may be generated in the scanner having the gimbal structure according to the present invention and the impulse transmitted to the vertical spring may be dispersed. Because of that, the transformation of the vertical spring may be reduced and the generated stress may be reduced. The scanner according to the present invention may have a relatively excellent shock resistance, compared with the conventional scanner including the stiff gimbal structure.

The detailed description for embodying the present invention is disclosed in the best mode for embodying the present invention described above.

The embodiments of the scanning micromirror according to the present invention may be applicable to various industrial fields such as a display industry.

The invention claimed is:

1. A scanning micromirror comprising:
a substrate comprising an open region;
a mirror plate provided in the open region;
a first gimbal provided between the substrate and the mirror plate, the first gimbal comprising a first curvature curved toward the mirror plate along an X-axis of the open region;
a second gimbal provided between the first gimbal and the mirror plate, the second gimbal comprising a second curvature formed along the first curvature of the first gimbal;
a first elastic body configured to connect the substrate with the first curvature of the first gimbal;
a second elastic body configured to connect the first gimbal with the second gimbal along a Y-axis of the open region; and
a third elastic body configured to connect the second gimbal with the mirror plate along the Y-axis of the open region.

2. The scanning micromirror according to claim 1, wherein the first and second gimbals are overall, with an X-axis direction width that is larger than a Y-axis direction width.

3. The scanning micromirror according to claim 1, wherein a distance from an end of the first curvature to the substrate is larger than a distance from the other end of the first curvature to the mirror plate.

4. The scanning micromirror according to claim 1, wherein a distance from an end of the second curvature to the substrate is larger than a distance from the other end of the second curvature to the mirror plate.

5. The scanning micromirror according to claim 1, wherein a distance from an end of the second curvature to the mirror plate is identical to the length of a third elastic body.

6. The scanning micromirror according to claim 1, wherein an inner circumferential surface of the first gimbal faces an outer circumferential surface of the second gimbal and each of the facing surfaces maintains a uniform internal there between.

7. The scanning micromirror according to claim 1, wherein a groove is formed in a connected region between the first gimbal and an end of the second elastic body, along a Y-axis direction.

8. The scanning micromirror according to claim 1, wherein a groove is formed in a connected region between the first gimbal and an end of the first elastic body, along an X-axis direction.

9. The scanning micromirror according to claim 1, wherein a groove is formed in a connected region between the second gimbal and an end of the third elastic body, along a Y-axis direction.

10. The scanning micromirror according to claim 1, wherein a width of the first gimbal is identical to a width of the second gimbal.

11. The scanning micromirror according to claim 1, wherein, the first and second gimbal are movable along a Z-axis of the open region by an external shock.

12. The scanning micromirror according to claim 1, wherein the first, second and third elastic bodies have different lengths and identical lengths, respectively.

13. The scanning micromirror according to claim 1, wherein the first elastic body has an internal region positioned in the first curvature and an external region positioned outer to the first curvature, and a length of the internal region is larger than a length of the external region.

14. The scanning micromirror according to claim 1, wherein at least one of the first, second and third elastic bodies has a gradually decreasing width from both ends toward a center thereof.

15. The scanning micromirror according to claim 1, wherein at least one of the first, second third elastic bodies has plane top and bottom surfaces and curved lateral surfaces.

16. The scanning micromirror according to claim 1, wherein a first end of the third elastic body is connected with a support of the second gimbal and the other second end of the third elastic body is connected with a support of the mirror plate, and thicknesses of the supports are larger than thicknesses of the first and second ends of the third elastic body.

17. The scanning micromirror according to claim 16, wherein:

a connected region between the first end of the third elastic body and the support of the second gimbal has a first tilted surface with a predetermined slope, a connected region between the other second end of the third elastic body and the support of the mirror plate has a second tilted surface with a predetermined slope, and edge lines of the supports are positioned between an edge line of the first tilted surface and an edge line of the second tilted surface.

18. A scanning micromirror comprising:

a substrate comprising an open region;

a mirror plate provided in the open region;

a first gimbal provided in an open region positioned between the substrate and the minor plate;

a second gimbal provided between the first gimbal and the mirror plate;

a first elastic body configured to connect the substrate with the first gimbal along an X-axis of the open region;

a second elastic body configured to connect the second gimbal with the mirror plate along a Y-axis of the open region; and a third elastic body configured to connect the first gimbal with the second gimbal along a Y-axis of the open region.

19. The scanning micromirror according to claim 18, wherein the first gimbal and the second gimbal comprise a curvature curved toward the mirror plate along the X-axis of the open region, respectively.

20. The scanning micromirror according to claim 19, wherein the first elastic body is connected with the curvature of the first gimbal.

* * * * *